United States Patent
Ganguin et al.

(10) Patent No.: US 10,989,617 B2
(45) Date of Patent: Apr. 27, 2021

(54) DYNAMIC TORQUE AND/OR FORCE CALIBRATION DEVICE

(71) Applicant: ETA SA Manufacture Horlogere Suisse, Grenchen (CH)

(72) Inventors: Fabrice Ganguin, Moutier (CH); Murielle Richard, Sion (CH)

(73) Assignee: ETA SA Manufacture Horlogere Suisse, Grenchen (CH)

( * ) Notice: Subject to any disclaimer, the term of this patent is extended or adjusted under 35 U.S.C. 154(b) by 190 days.

(21) Appl. No.: 16/112,899

(22) Filed: Aug. 27, 2018

(65) Prior Publication Data
US 2019/0094096 A1 Mar. 28, 2019

(30) Foreign Application Priority Data
Sep. 25, 2017 (EP) .................................... 17192945

(51) Int. Cl.
*G01L 25/00* (2006.01)
(52) U.S. Cl.
CPC ............ *G01L 25/003* (2013.01); *G01L 25/00* (2013.01); *G01N 2203/021* (2013.01)
(58) Field of Classification Search
CPC .............................. G01L 25/00; G01L 25/003
See application file for complete search history.

(56) References Cited

U.S. PATENT DOCUMENTS

| | | | | |
|---|---|---|---|---|
| 2,703,976 A * | 3/1955 | Livermont | ............ | G01L 25/003 73/1.12 |
| 3,050,978 A * | 8/1962 | Zimmerman | ......... | G01L 25/003 73/1.09 |
| 6,450,045 B1 * | 9/2002 | Crane | ................... | G01L 25/003 73/862 |
| 7,296,481 B2 * | 11/2007 | Kahle | ....................... | G01F 1/80 73/856 |
| 7,757,540 B2 * | 7/2010 | Dabrowski | ........... | G01L 25/003 73/1.12 |
| 8,583,382 B1 * | 11/2013 | Loase | ..................... | G01L 5/008 702/41 |
| 8,713,986 B2 * | 5/2014 | Hsieh | .................. | B25B 23/1427 73/1.12 |

(Continued)

FOREIGN PATENT DOCUMENTS

CN 1820182 A 8/2006
CN 103528752 1/2014

(Continued)

OTHER PUBLICATIONS

Machine English Translation of JP 2001-228041 A (Year: 2001).*

(Continued)

*Primary Examiner* — John Fitzgerald
(74) *Attorney, Agent, or Firm* — Oblon, McClelland, Maier & Neustadt, L.L.P.

(57) ABSTRACT

A torque or force calibration device is for a unit intended to measure or to apply a torque or a force respectively. The device includes a first part, a second part, and at least one flexible element linking the first part to the second part. The second part is mounted to be mobile in rotation or in translation relative to the fixed first part. The device includes an abutment which limits the displacement of the second part and thereby sets the maximum torque or the maximum force of the calibration device.

19 Claims, 4 Drawing Sheets

(56) References Cited

U.S. PATENT DOCUMENTS

| | | | | |
|---|---|---|---|---|
| 8,931,324 | B2* | 1/2015 | Yamamoto | G01L 25/003 |
| | | | | 73/1.09 |
| 9,880,066 | B2* | 1/2018 | Larsen | G01L 25/00 |
| 10,126,186 | B2* | 11/2018 | Berme | G01L 1/2206 |
| 10,317,303 | B2* | 6/2019 | Spirer | G01L 5/243 |
| 10,317,305 | B2* | 6/2019 | Yamaguchi | G01L 25/00 |
| 2008/0271515 | A1* | 11/2008 | Dabrowski | G01L 25/003 |
| | | | | 73/1.12 |
| 2011/0308295 | A1* | 12/2011 | Yamamoto | G01L 25/003 |
| | | | | 73/1.09 |
| 2012/0031161 | A1* | 2/2012 | Hsieh | B25B 23/1427 |
| | | | | 73/1.12 |
| 2012/0037723 | A1* | 2/2012 | Moradell-Casellas | |
| | | | | F02K 1/763 |
| | | | | 239/265.19 |
| 2015/0075250 | A1* | 3/2015 | Kosa | G01L 5/162 |
| | | | | 73/1.15 |
| 2016/0273990 | A1* | 9/2016 | Larsen | G01L 25/00 |
| 2018/0328806 | A1* | 11/2018 | Yamaguchi | G01L 25/006 |
| 2020/0166426 | A1* | 5/2020 | Childers | B25B 23/1405 |

FOREIGN PATENT DOCUMENTS

| | | | |
|---|---|---|---|
| CN | 110261034 A | * | 9/2019 |
| JP | 2001-228041 | | 8/2001 |
| WO | WO 2018041773 A | * | 3/2018 |

OTHER PUBLICATIONS

Combined Chinese Office Action and Search Report dated Dec. 14, 2020, in Chinese Patent Application No. 201811106876.9 (with English translation), 17 pages.

European Search Report dated Mar. 21, 2018 in European Application 17192945.8 filed on Sep. 25, 2017 (with English Translation of Categories of Cited Documents).

* cited by examiner

DYNAMIC TORQUE AND/OR FORCE CALIBRATION DEVICE

This application claims priority from European patent application No. 17192945.8 filed on Sep. 25, 2017, the entire disclosure of which is hereby incorporated herein by reference.

OBJECT OF THE INVENTION

The present invention relates to the field of the calibration devices for force or torque measurement units and for fixing units intended to apply a constant force or torque.

TECHNOLOGICAL BACKGROUND

In the context of assembly processes (sector TO), there is a need to observe a torque, a force or even a force and a torque. These torque and force characteristics require specific measuring devices that have to be periodically calibrated.

The calibration can be done via sensors which have the disadvantage of being costly, or even via standard weights. In the latter case, the calibration of a torque measurement unit is performed using a standard weight of mass m creating a torque M through a lever arm whose length l is perfectly known (M=m*l). This calibration procedure requires the unit to leave its workshop and possibly be sent to the supplier. The unit is then out of service for 1 to 3 days, resulting in inconveniences in production control. Furthermore, between the off-site calibration and the return to the workshop, the measurement unit may have undergone an impact which affects its calibration. Moreover, the calibration of a measurement unit by a standard weight represents a static measurement condition and, consequently, does not involve all of the mechanical design of the unit. Now, the units measuring torque, and in particular friction torque, are supposed to measure dynamically, that is to say guarantee a torque at each given angle. In reality, as shown in FIG. 10, a certain drift on the measurement curve can be observed. A static calibration via a standard weight will not make it possible to observe or correct this error of linearity of the torque/angle function.

SUMMARY OF THE INVENTION

To remedy the abovementioned disadvantages, the object of the present invention is to propose a calibration device without sensor, which makes the principle of operation thereof simple and inexpensive and makes it possible to avoid the periodic calibrations necessary to the correct operation of the sensor. Another object of the present invention is to propose a calibration device that is compatible on any measuring device for which it has to ensure the calibration and that allows for an instantaneous calibration thereof. Another object of the present invention is to propose a calibration device allowing for a dynamic calibration of both motorized and non-motorized units.

To this end, the present invention proposes a novel force calibration device capable of working in both directions of displacement (corresponding to the measurement of a compression force and of a pulling force) and a novel torque calibration device operating in both directions of rotation. The torque and force calibration devices are provided with a part that is mounted to be mobile respectively in rotation or in translation relative to a fixed part. The two parts are linked by one or more flexible elements dimensioned so as to deform elastically when the mobile part is stressed. According to the invention, the travel of the mobile part is limited by an abutment which determines the maximum torque or force of the calibration device.

Advantageously, the torque calibration device has been previously calibrated in order to be able to check the linearity of the torque/angle function of the motorized measurement units up to this maximum torque.

During the calibration of the measurement unit, the torque or force (for the case of a pulling force measurement unit) calibration device can be easily coupled to the measurement unit. To this end, the device is provided in its mobile part and in its fixed part with orifices making it possible to secure components of the measurement unit. In the case of the use of the calibration device on a compression force measurement unit, no means of coupling to the measurement unit is required.

Other advantages will emerge from the features set out in the claims, from the detailed description of the invention given hereinbelow using the attached drawings given by way of nonlimiting examples.

DETAILED DESCRIPTION OF THE INVENTION

The present invention relates to a calibration device for units intended to measure a force or a torque, or even for units intended to apply a given force or torque such as power screwdrivers.

Figure 1:
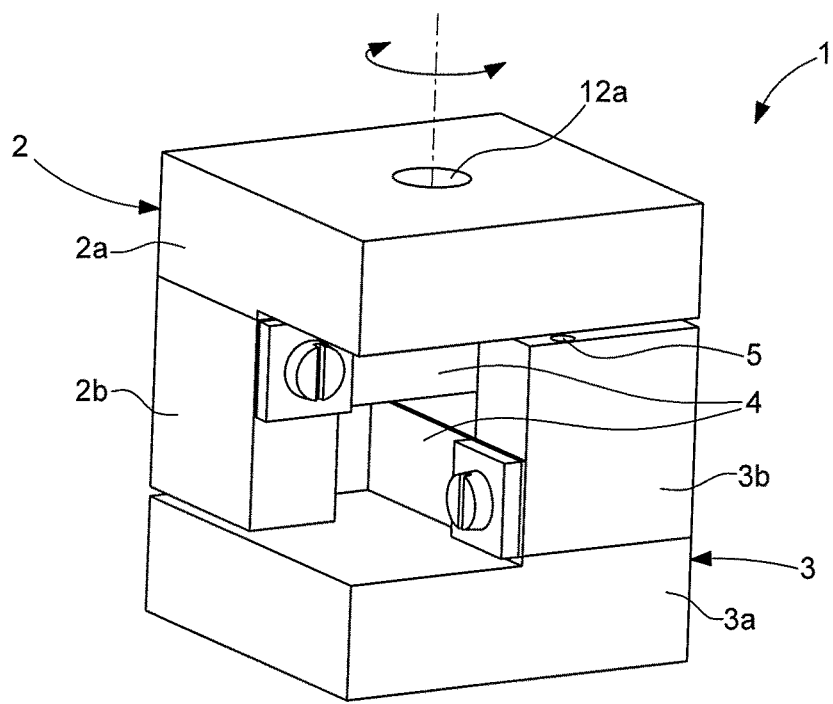
FIGS. 1 and 2 represent, through perspective views, two variants of the torque calibration device according to the invention.
Figure 2:
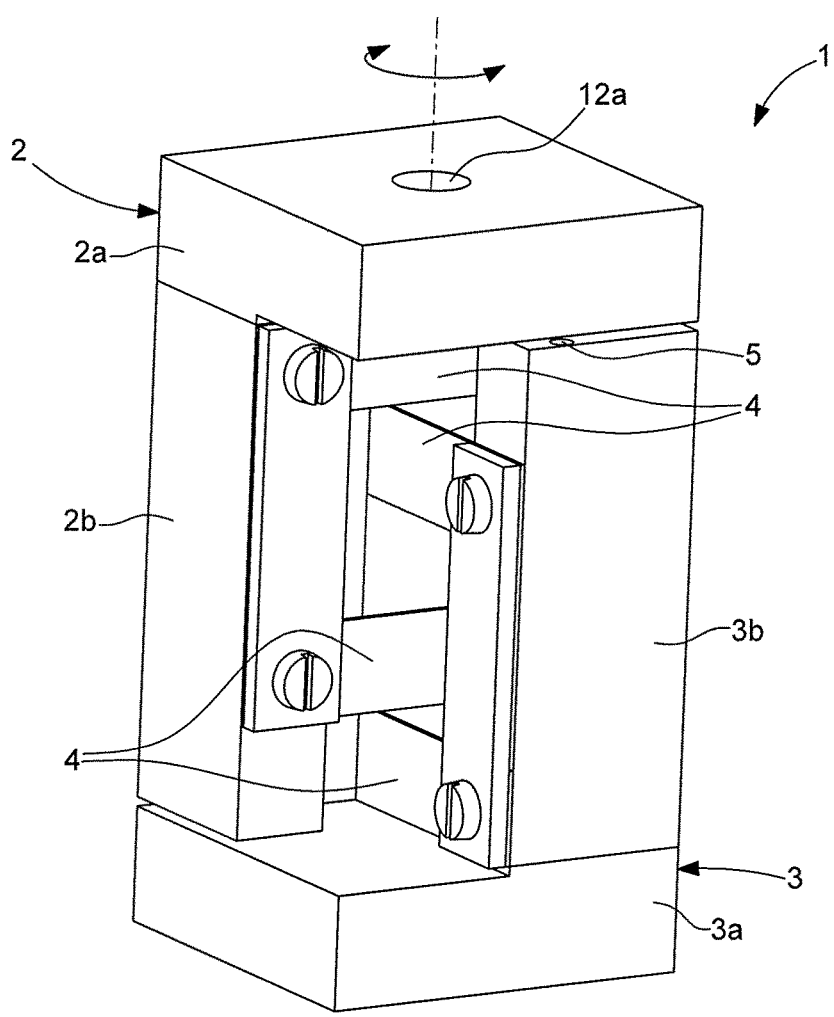
Figure 3:
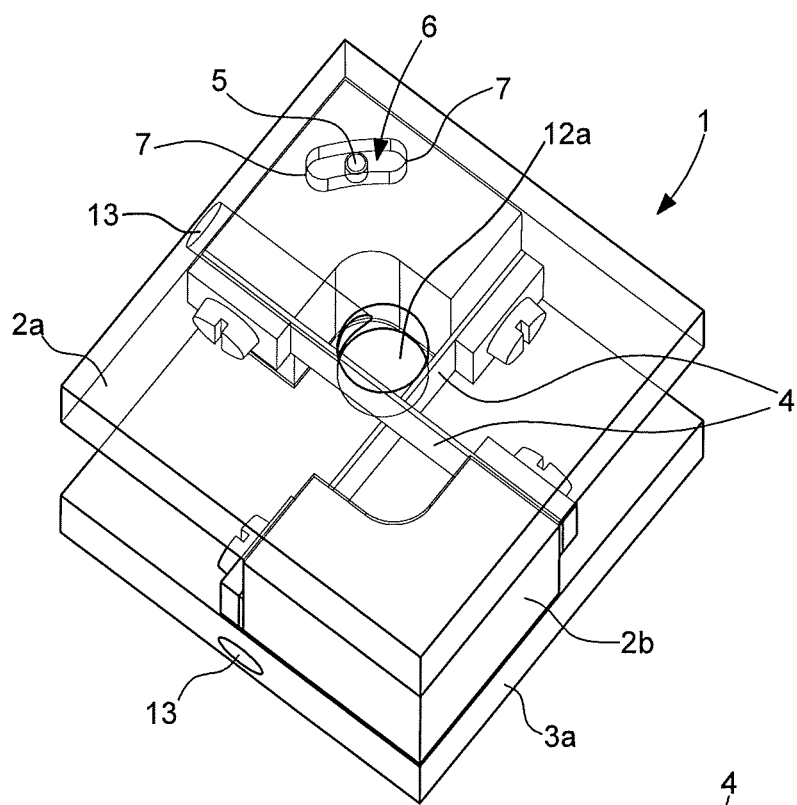
FIG. 3 represents a view from another angle of FIG. 1 with the abutment pin and the blades visible transparently.
Figure 8A:
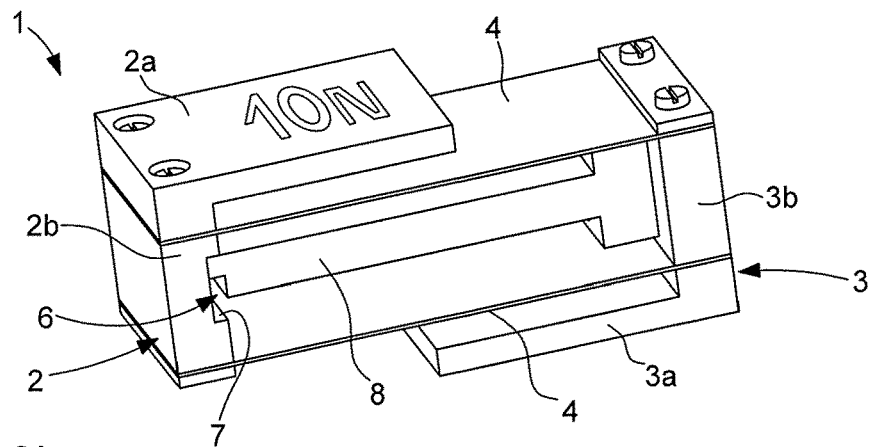
FIGS. 8a and 8b respectively represent a perspective view and a side view of the force calibration device according to the invention.
Figure 8B:
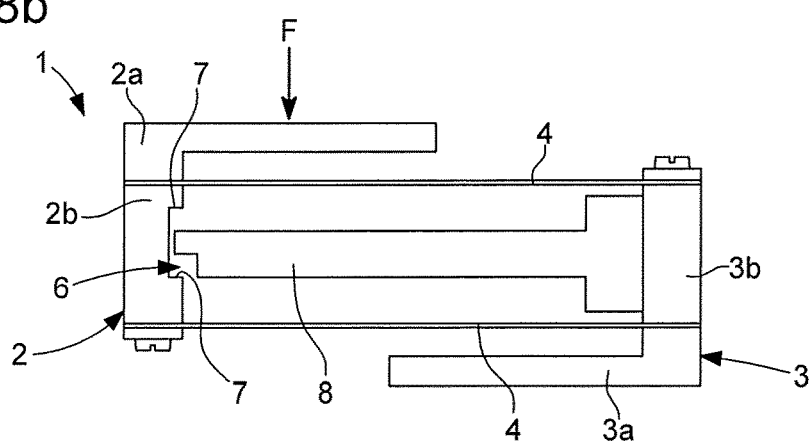

The torque calibration device 1 according to the invention is represented in FIGS. 1-3 and the force calibration device 1 is represented in FIGS. 8a-8b. They comprise two parts 2,3 mounted to be mobile relative to one another. In the examples, the part 2 is referred to as mobile and the part 3 is referred to as fixed, but the devices are configured to operate with the part 3 acting as mobile part and the part 2 acting as fixed part. For the torque calibration device, the part 2 is mounted to be mobile in rotation in both directions relative to the fixed part 3. For the force calibration device, the part 2 is mounted to be mobile in translation relative to the fixed part 3. The device can be used in both directions of displacement with a force F applied to the mobile part 2 as illustrated in FIG. 8b.

The two parts 2,3 are linked by one or more flexible elements 4 forming blades or sectional bars of variable section. Flexible element should be understood to be an element composed of a material tolerant to significant deformations without plastic deformation. In this respect, the flexible elements can be produced in spring stainless steel, in sintered steel, in quenched and tempered steel, in an aluminium, titanium, bronze, brass alloy, or even in a plastic material.

Each flexible element 4 is fixed at one end onto the mobile part 2 and at its other end onto the fixed part 3. The flexible elements can be added by screwing. It is also possible to consider producing the standard in one piece by wire electro-erosion for example.

In the examples illustrated, the mobile part 2 and the fixed part 3 have a substantially equivalent form with a planar base 2a,3a topped by an upright 2b,3b onto which is fixed the end of the flexible element 4. The fixed 3 and mobile 2 parts are positioned in reverse directions relative to one another, in so-called head-to-tail position, with the base 3a of the fixed part 3 forming the support of the device and the base 2a of the mobile part 2 forming the portion to which the torque or the force is applied. Preferably, the envelope of the device has a straight prismatic form with square base (FIGS. 1-2) or rectangular base (FIGS. 8a-8b). The whole forms a compact device with dimensions not exceeding a few centimetres (less than 5 cm).

For the torque calibration device (FIGS. 1-3), the mobile part 2 and the fixed part 3 comprise a base 2a,3a with a vertical upright 2b,3b secured to a corner of the base 2a,3a. Preferably, the upright 2b,3b has a bracket profile with a right angle coinciding with a right angle of the base 2a,3a. The respective bases 2a,3a of the mobile part 2 and of the fixed part 3 are disposed facing one another with the uprights 2b,3b between the two. These uprights 2b,3b are disposed on opposite corners of the respective bases 2a,3a with an end of the flexible element 4 screwed onto an edge of each upright 2b,3b.

For the force calibration device (FIGS. 8a-8b), the mobile part 2 and the fixed part 3 also have a reversed position relative to one another. The mobile part 2 and the fixed part 3 have a generally L-shaped section with one branch of the L forming the base 2a,3a and the other branch of the L forming the upright 2b,3b. The bases 2a,3a can be more or less long and extend, according to a variant, up to approximately mid-width of the device as shown in FIGS. 8a-8b or, according to another variant not represented, extend short of or beyond mid-width and possibly over all the width of the device. The uprights 2b,3b are disposed vertically facing one another with the flexible elements 4 screwed at each end into the thickness of the upright 2b,3b.

For both calibration devices, the angular displacement or the translational displacement of the mobile part 2 is limited by an abutment 7 which respectively determines the maximum torque or the maximum force of the device. FIG. 3 shows, for the torque calibration device, the pin 5 driven into an opening 6 in the form of a circular arc. The pin 5 is positioned between the upright 3b of the fixed part 3 and the base 2a of the mobile part 2. In the example illustrated, the pin 5 is secured to the fixed part 3 and the opening 6 is formed in the base 2a of the mobile part 2. The reverse is also possible. The mobile part 2 is mounted to be mobile in both directions of rotation with the pin 5 positioned at rest in the middle in the circular arc with each end of the circular arc forming the abutment 7. For the force calibration device, the opening 6 is formed in the upright 2b of the mobile part 2, or, according to a variant not represented, in the upright 3b of the fixed part 3, with the end of a tongue 8 which is secured to the opposite upright being displaced within the opening. At rest, the end of the tongue is disposed at mid-travel. Upon a stressing of the device in one or other of the directions of displacement, the end of the tongue is positioned against one of the abutments 7 delimiting the opening 6.

Depending on the range of torque or of force to be covered by the calibration device, the geometry and the number of flexible elements are variable. Moreover, there can be several variant arrangements of the flexible elements within the calibration device.

Figure 4:
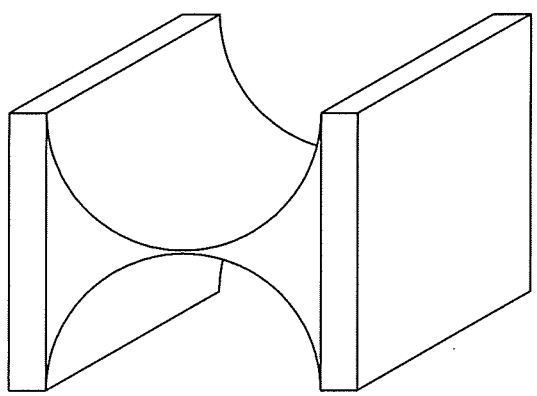
FIG. 4 represents a perspective view of a variant of a flexible element of the calibration device according to the invention (figure taken from thesis No 2194 (2000) by Simon Henein, EPFL).
Figure 5:
FIG. 5 represents a perspective view of another variant of a flexible element of the calibration device according to the invention with a reinforced portion at its centre bracketed by flexible portions forming a circular neck.
Figure 6:
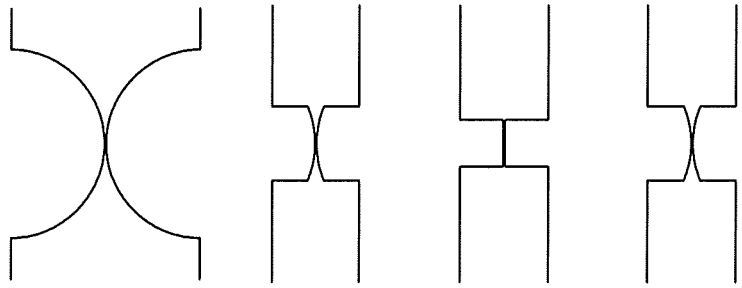
FIG. 6 represents partial plan views of different geometries of the flexible portions of the flexible element of FIG. 5 (figures taken from thesis No 2194 (2000) by Simon Henein, EPFL).

The flexible element can form a blade of constant width over all the length as in the examples illustrated in FIGS. 1 and 8a. It is also possible to have blade geometries with a variable width, for example in trapezoidal or even rectangular form with an oblong hole at its centre. Other designs are possible with sectional bars describing two concave half-circles as in FIG. 4. It is also possible to envisage a flexible element 4 reinforced at its centre, with prismatic or circular flexible parts bracketing the reinforced part (FIGS. 5 and 6).

The number of flexible elements within the torque or force calibration device can be 1, 2, 3, 4, even more. For the torque calibration device, the design with two orthogonal blades is optimal (FIG. 1). The two blades can be disposed at different heights on the uprights or, according to a variant not represented, the two blades can cross at their centre. The two blades make it possible to correctly guide the movement and the orthogonal arrangement maximizes the rigidity in the transverse direction of the device. A device with one blade will allow the device to fulfil its calibration function. However, the axis of rotation will be less well controlled. With more than two blades, the movement is super-guided, therefore more rigid and more sensitive to the mechanical tolerances of machining and of assembly. For the force calibration device, a construction with two blades is also preferred for a specific linear displacement without excessive rigidity of the system. Advantageously, the two flexible elements 4 are disposed parallel relative to each base 2a,3a and on either side of the opening 6 (FIGS. 8a-8b).

In concrete terms, three torque typologies are identified, namely:

Friction torque (0.09-1.0 Nmm)
Resisting torque (1.0-50.0 Nmm)
Breaking torque (>50.0 Nmm).

and four distinct torque calibration devices were produced to cover these ranges.

As an example, table 1 includes the torque ranges covered and the geometries of the corresponding calibration device for blades made of spring stainless steel.

TABLE 1

| | Data | | | | | | | |
|---|---|---|---|---|---|---|---|---|
| | | Standard | | | | | Standard | |
| | Range of torques | max torque | Blades | | | | Min ext diam | Min height |
| Family of parts | (Nmm) | (Nmm) | h (mm) | b (mm) | l (mm) | N° | (mm) | (mm) |
| u-torque supplies | 0.015-0.09 | 0.15 | 0.05 | 2 | 10 | 1 | 15 | 5 |
| Friotion supplies | 0.6-1 | 1.5 | 0.1 | 2.5 | 10 | 2 | 16 | 6 |
| Resisting/breaking/triction supplies | 1-32 | 50 | 0.25 | 5 | 10 | 3 | 15 | 11 |
| Oscillating mass + segment | 0.500 | 500 | 0.35 | 20 (2 × 10) | 10 | 4 | 15 | 43 |

The standards No 1 to 3 have a configuration according to FIG. 1 with two orthogonal blades and the standard No 4 comprises four orthogonal blades according to the geometry of FIG. 2. All the blades have a constant rectangular section with a width b and a thickness h. In the examples, the length l of the blades has been kept constant (10 mm) and the rigidity of the device has been modulated by changing the thickness h and the width b of the blades. Consequently, the standard No 4 comprises four blades to achieve the requisite level of rigidity. However, by also modulating the length of the blade, the construction could have been limited to two blades for one and the same maximum torque.

Regarding the forces, three force typologies are identified, namely;
Compression force of springs
Resisting force
Driving/drawing force,
and two standards were designed accordingly. Table 2 includes the dimensions for 10 and 50 N standards for spring stainless steel blades.

TABLE 2

| | Max force (N) | Max travel (mm) | b (mm) | l (mm) | h (mm) |
|---|---|---|---|---|---|
| 10N standard | 10 | 2 | 20 | 40 | 0.35 |
| 50N standard | 50 | 2 | 20 | 40 | 0.55 |

As for the torque calibration device, several dimensionings are possible to achieve the same maximum force of the standard with one and the same travel. In the examples, a choice was made to keep one and the same length l (40 mm) and one and the same width b (20 mm) of the blades of rectangular section and to modify only the thickness h of the blade.

Figure 7:
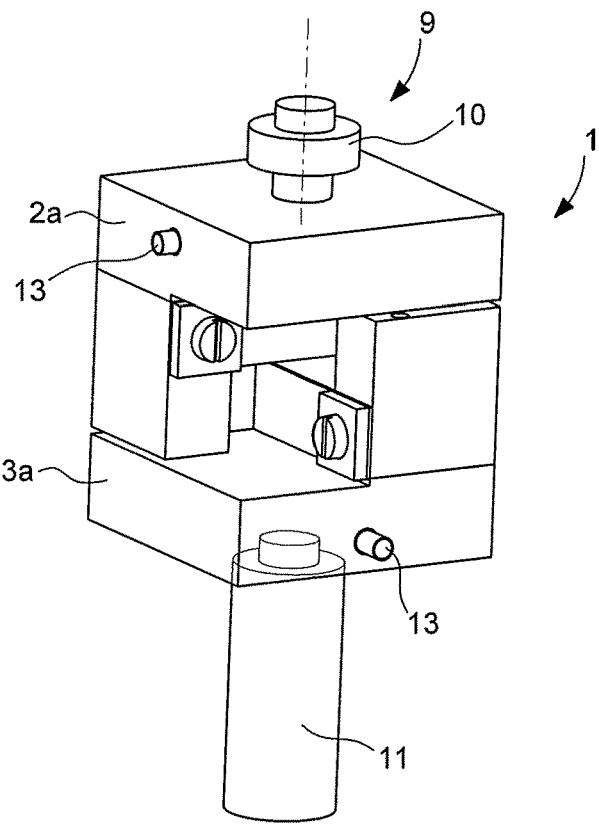
FIG. 7 schematically represents a torque measurement unit with the calibration device according to the invention positioned between the pin and the counter-pin.
Figure 10:
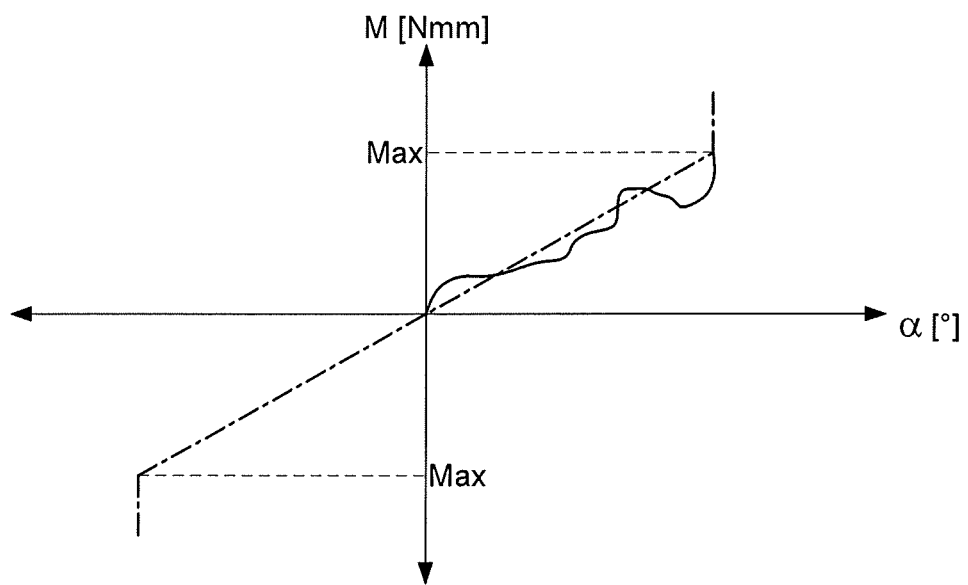
FIG. 10 represents the linear calibration curve of the torque calibration device according to the invention versus an irregular measurement curve of a torque measurement unit.

FIG. 7 represents the torque calibration device 1 according to the invention positioned on a torque measurement unit 9 with the mobile part 2 of the device mounted on the pin 10 and the fixed part 3 mounted on the counter-pin 11. For the fixing, each base 2a,3a is provided with a central orifice 12a visible in FIGS. 1-3 to directly receive the pin and the counter-pin or an intermediate part and provided with a lateral screw 13 disposed on the bases. During the calibration of the measurement unit, the mobile part rotated by the pin comes into abutment after a given angular displacement corresponding to the maximum torque of the standard. In FIG. 10, the maximum torque reached at end of travel can be seen for both directions of rotation. The calibration device according to the invention also allows for a dynamic calibration as a function of the angular displacement to abutment for motorized measurement units.

Figure 9:
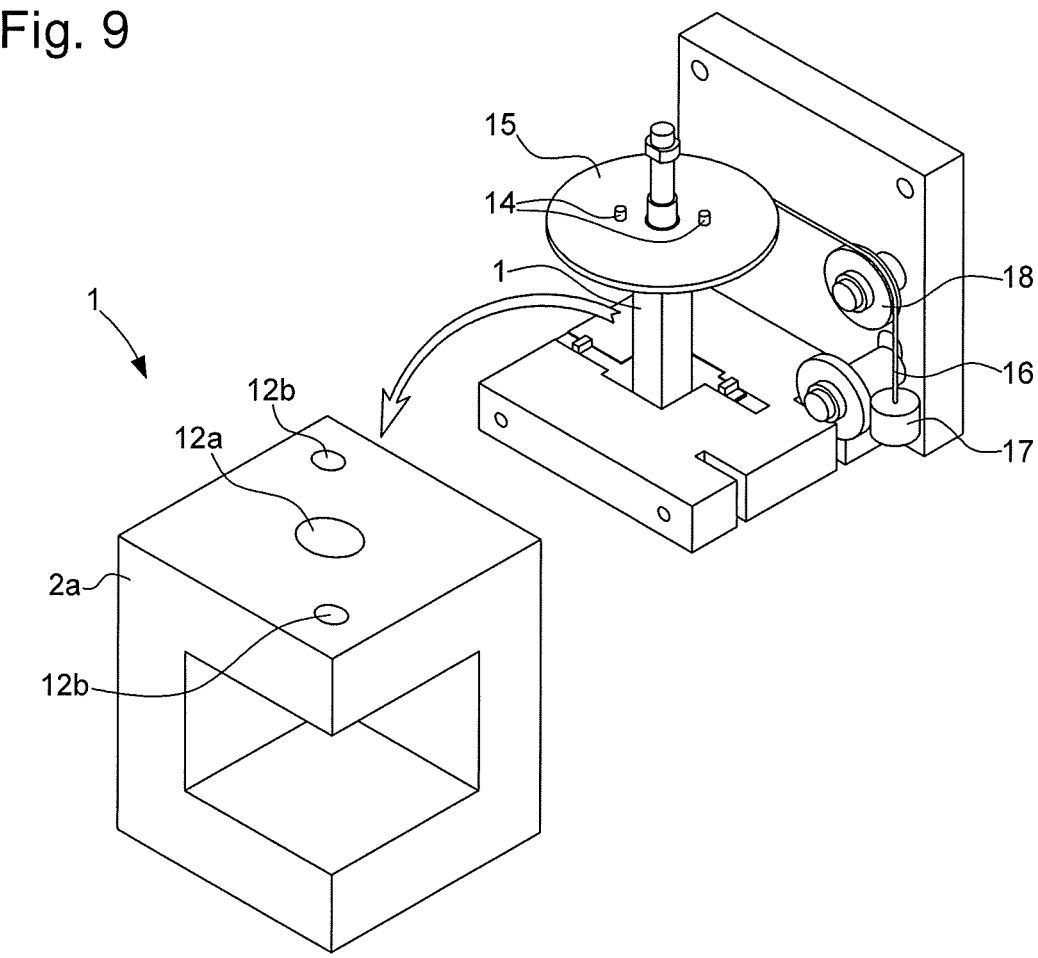
FIG. 9 schematically represents the equipment implemented to gauge the torque calibration device according to the invention.

A dynamic calibration requires the calibration device to have itself been calibrated previously. The calibration is performed in a conventional manner using standard weights. FIG. 9 represents the unit used for this purpose. The mobile part of the calibration device 1 is secured via two driving pins 14 driven into lateral orifices 12b of the base with a central pulley 15 which receives the cable 16 provided with the standard weight 17 at its end. Using different standard weights, the torque/angle of rotation straight line is established (FIG. 10). The calibration of the calibration device thus makes it possible to characterize the range of operation of the standard in terms of linearity and of target value, that is to say maximum value. The desired maximum torque is then set on the calibration device by the abutment.

KEY (1) Torque or force calibration device
(2) Mobile part
  a. Base
  b. Upright
(3) Fixed part
  a. Base
  b. Upright
(4) Flexible element, also called compliant element
(5) Abutment pin
(6) Opening
(7) Abutment
(8) Tongue
(9) Torque measurement unit
(10) Pin
(11) Counter-pin
(12) Orifice
  a. Central
  b. Lateral
(13) Fixing screw
(14) Driving pin
(15) Central pulley
(16) Cable
(17) Standard weight
(18) Return pulley

What is claimed is:
1. A torque or force calibration device for a unit intended to measure or to apply a torque or a force respectively, said device comprising:
a first part, a second part, and at least one flexible element linking the first part to the second part, the second part being mounted to be mobile in rotation or in translation relative to the fixed first part, the device comprising an abutment that limits the displacement of the second part and thereby sets the maximum torque or the maximum force of the calibration device, wherein the first part and the second part are each formed by a planar base topped by an upright onto which is fixed an end of the flexible element, the first part and the second part being disposed head to tail with the base of the first part forming the support of the device and the base of the second part forming the portion to which the torque or the force is applied during the calibration of the unit.

2. The device according to claim 1, wherein the second part is mounted to be mobile in both directions of rotation or in both directions of translation respectively with an abutment for each direction of rotation or each direction of translation.

3. The device according to claim 1, wherein, for the torque calibration device, each upright has a bracket profile with a right angle coinciding with a right angle of its base, the ends of the flexible element being respectively fixed onto an edge of each upright.

4. The device according to claim 1, wherein, for the force calibration device, the first part and the second part have a generally L-shaped section with one branch of the L forming the base and the other branch forming the upright, the ends of the flexible element being respectively fixed in the thickness of each upright.

5. The device according to claim 1, wherein the force calibration device comprises a tongue having one end disposed in an opening delimiting two abutments, the opening being formed in the upright of the second part and the tongue having its other end secured to the upright of the first part or vice versa.

6. The device according to claim 1, wherein the force calibration device comprises two flexible elements extending parallel between the uprights.

7. The device according to claim 1, wherein the torque calibration device comprises two or four flexible elements disposed orthogonally relative to one another along the uprights.

8. The device according to claim 1, wherein, for the torque calibration device, each base comprises an orifice allowing the coupling of said device to the unit intended to measure or to apply the torque.

9. The device according to claim 1, wherein the torque calibration device has been previously gauged to allow a dynamic calibration of the unit intended to measure or to apply the torque when the latter is motorized.

10. The device according to claim 1, wherein the geometry and the number of flexible elements are determined to cover four ranges of torques extending respectively up to 0.015, 1.5, 50 and 500 Nmm and two force ranges of 10 and 50 N.

11. The device according to claim 1, wherein an envelope of the device forms a straight prism with square or rectangular base having no dimension exceeding 5 cm.

12. The device according to claim 1, wherein the flexible element is made of spring stainless steel, sintered steel, quenched and tempered steel, aluminium, titanium, bronze, brass alloy, or a plastic material.

13. The device according to claim 1, wherein the torque calibration device comprises a pin driven into an opening in the form of a circular arc delimiting two abutments, the pin being secured to the upright of the first part and the opening being formed in the base of the second part or vice versa.

14. The device according to claim 13, wherein, in the absence of stressing of said device, the pin or the tongue is located at mid-travel in the opening.

15. The device according to claim 1, wherein the flexible element is formed by a blade or a sectional bar.

16. The device according to claim 15, wherein the blade is in the form of a rectangle, trapezium or of a rectangle with an oblong hole at its centre.

17. The device according to claim 15, wherein the flexible element is a sectional bar describing two attached concave half-circles or a sectional bar with a reinforced part at its centre and prismatic or circular parts bracketing the reinforced part.

18. A torque or force calibration device for a unit intended to measure or to apply a torque or a force respectively, said device comprising:
a first part, a second part, and at least one flexible element linking the first part to the second part, the second part being mounted to be mobile in rotation or in translation relative to the fixed first part, the device comprising an abutment that limits the displacement of the second part and thereby sets the maximum torque or the maximum force of the calibration device,
wherein the flexible element is formed by a blade or a sectional bar.

19. A torque or force calibration device for a unit intended to measure or to apply a torque or a force respectively, said device comprising:
a first part, a second part, and at least one flexible element linking the first part to the second part, the second part being mounted to be mobile in rotation or in translation relative to the fixed first part, the device comprising an abutment that limits the displacement of the second part and thereby sets the maximum torque or the maximum force of the calibration device,
wherein an envelope of the device forms a straight prism with square or rectangular base having no dimension exceeding 5 cm.

\* \* \* \* \*